United States Patent [19]

Christensen et al.

[11] Patent Number: 5,424,032
[45] Date of Patent: Jun. 13, 1995

[54] METHOD AND APPARATUS FOR CONTROLLING MICROORGANISMS

[75] Inventors: Ronald J. Christensen, Montgomery, Ohio; Gary L. Baker, Augusta, Me.; Lyle H. Steimel, Forest Park, Ohio

[73] Assignee: Diversey Corporation, Mississauga, Canada

[21] Appl. No.: 166,278

[22] Filed: Dec. 13, 1993

Related U.S. Application Data

[63] Continuation of Ser. No. 919,163, Jul. 23, 1992, abandoned.

[51] Int. Cl.$^6$ .......................................... C23F 11/08
[52] U.S. Cl. ........................................ 422/14; 422/7; 422/24
[58] Field of Search ............... 422/7, 14, 24; 423/477

[56] References Cited

U.S. PATENT DOCUMENTS

| | | | |
|---|---|---|---|
| 2,443,429 | 6/1948 | Marks et al. | 210/11 |
| 3,628,663 | 12/1971 | Derham | 210/141 |
| 4,008,136 | 2/1977 | Williams | 204/158 |
| 4,230,571 | 10/1980 | Dadd | 210/760 |
| 4,255,383 | 3/1981 | Schenck | 422/24 |
| 4,259,269 | 3/1981 | Flowers | 261/151 |
| 4,297,222 | 10/1981 | Takeguchi et al. | 210/748 |
| 4,372,860 | 2/1983 | Kaas | 210/748 |
| 4,390,441 | 6/1983 | Beavan | 252/96 |
| 4,719,083 | 1/1988 | Baker et al. | 422/15 |
| 4,752,401 | 6/1988 | Bodenstein | 210/746 |
| 4,874,435 | 10/1989 | Caracciolo | 422/24 |
| 4,874,489 | 10/1989 | Callerame | 423/477 |
| 5,118,426 | 6/1992 | Duncan et al. | |
| 5,130,033 | 7/1992 | Thornhill | |

FOREIGN PATENT DOCUMENTS

| | | |
|---|---|---|
| 0027278 | 4/1981 | European Pat. Off. . |
| 0444530 | 9/1991 | European Pat. Off. . |
| 3117473 | 11/1982 | Germany . |
| 3843679 | 7/1990 | Germany . |
| 62294579 | 8/1989 | Japan . |

OTHER PUBLICATIONS

Cooling Towers Institute 1992 Annual Technical Paper No. TP92-14 bycus by Marcus Vaska and Winston Go, pp. 1-13.
Catalog pages from Wallace & Tiernan Pennwalt Equipment, Chemicals and Health Products Catalog.
Lectranator Automatic Chlorine Systems, Owner's Manual For All SRT Models, pp. 1-9.
The Handbook of Chlorination, Second Edition, Geo. Clifford White, Index, Chapter 3, Chapter 12, and Chapter 14.

*Primary Examiner*—Timothy M. McMahon

[57] ABSTRACT

Water in a process water system, such as a cooling tower or pulp and paper processing plant, is treated to destroy biological microorganisms by diverting the portion of the water flowing through the system to a side stream. In the side stream, chemicals are added such as halide ions or sodium chlorite. The water is then passed through an electrolysis unit or a UV radiation unit to oxidize the precursor to form an active oxidant. Advantageously, the pH of the side stream can be lowered to significantly improve the oxidization of the halide ions. When a very small portion of the flow rate is passing through the side stream, the acid added does not significantly alter the pH of the entire system. In a preferred embodiment, the acid added is phosphonic acid which acts as an antiscalant. Also included in the present invention is a method to inject oxidant precursors into a process water system through an oxidant generation station.

7 Claims, 2 Drawing Sheets

METHOD AND APPARATUS FOR CONTROLLING MICROORGANISMS

This application is a continuation of application 07/919,163 filed on Jul. 23, 1992, now abandoned.

BACKGROUND OF THE INVENTION

Virtually all open water systems have problems with microorganisms such as bacteria and algae, and various treatments are used to eliminate the microorganisms. For example, in swimming pools it is common to add a source of chlorine to destroy microorganisms. Other water systems employ additional biocides and algicides. It is very common to add chlorine or ozone or other chemicals to drinking water to destroy microorganisms.

Environmental and health regulations have generally insured that chemical treatments are safe. However, due to increased sensitivity to environmental concerns, philosophically it is preferable to minimize or eliminate the use of chemicals for treatment of water, particularly where the water is either consumed or discharged into the environment.

One particular method of destroying microorganisms is ultraviolet irradiation. At approximately 254 nanometers, ultraviolet radiation will destroy most microorganisms. Ultraviolet irradiation is used to treat potable water. It has also been used to treat swimming pools.

Electrolytic treatment of brine solution is used to generate hypohalite species which is added to waste water to destroy microorganisms.

Cooling towers and similar water systems require a sophisticated combination of chemical treatments to overcome a variety of problems. Antiscalants, bactericides, and other chemicals must be added to the cooling tower water. High intensity ultraviolet irradiation can cause a breakdown of certain chemicals. Also, with a system such as a cooling tower, algae tends to grow on the portion of the system which is exposed to the environment. There is no good way to expose this surface to ultraviolet radiation to prevent algae growth. Other microorganisms also grow on areas such as heat exchangers which are totally inaccessible. Therefore, some biocide or algicide is required.

Also, in cooling towers, the heat generated by the ultraviolet light source is prone to cause scale formation on the U.V. lamp particularly with medium pressure lamps. This is in part due to the temperature, alkalinity and total hardness of the water. Turbity also interferes with U.V. light transmission. For these reasons, ultraviolet radiation has not been used to destroy microorganisms in open water systems.

SUMMARY OF THE INVENTION

Accordingly, it is an object of the present invention to provide a method of treating water in a water system such as cooling towers which reduces the need to add typical chemical biocides and algicides and permits the use of generally innocuous chemicals for treatment of microorganisms.

Further, it is an object of the present invention to provide a method to treat water systems employing either ultraviolet irradiation or electrolysis in order to destroy microorganisms.

These objects and advantages of the present invention are attained by treating the circulating water in a water system through a side stream wherein only a small fraction of the circulating water is diverted to either an ultraviolet irradiation station or an electrolysis station. By treating a smaller fraction of the water system with the ultraviolet irradiation or the electrical current, less power is required. This also requires less capital expenditures.

Further, by using a side stream treatment of the water system, additional treating agents can be added in the side stream to provide a synergistic effect. Thus, according to the present invention, a chemical such as sodium bromide or sodium chloride or other halide salts, sodium chlorite and/or peroxide can be added in a side stream of a cooling tower or other water system and pass through the ultraviolet station or the electrolysis station to be converted into active oxidants which then will destroy microorganisms throughout the system. The ultimate by-product from this is, for example, a halide ion which is environmentally innocuous at the required use levels.

Further, many water systems, and recirculating water systems in particular, operate at a basic pH. The formation of the hypohalite ions and other oxidants is promoted by an acidic pH. Accordingly, the treatment in a side stream permits acidification of only a small percentage of the total flow. This can then be passed through the ultraviolet irradiation or the electrolysis station where, for example, the hypohalite ions will be formed. Since only a very small portion of the water in the system passes through the side stream, this pH change will not have a significant impact on the pH of the entire system, but will significantly increase the formation of the hypohalite ions. Active hypohalous acid will then circulate through the entire system and have an impact on the entire system.

Further, with electrolysis, the addition of the oxidant precursor in a side stream increases concentration and therefore conductivity. This increase in concentration improves electrolysis efficiency in the side stream.

It should be noted that the use of halide ions and mineral acids for water treatment is particularly safe and the primary product would simply be added in the side stream to provide a synergistic effect. Thus, according to the present invention, a chemical such as sodium bromide or sodium chloride would be employed and the final products produce minimal environmental impact.

Further, the present invention permits the addition of a combination of halide ions and other species into the system, permitting, for example, formation of both hypochlorite, hypobromite, hypoiodite, chlorine dioxide and peroxide which can provide a synergistic effect on the destruction of microorganisms. The objects and advantages of the present invention will be further appreciated in light of the following detailed description and Figure in which:

DETAILED DESCRIPTION

The present invention incorporates the apparatus and method for in situ generation of an oxidant to act as an algicide and bactericide for a variety of water systems.

In particular, the present invention is suitable for use with process water systems such as cooling towers, chilled water systems, pasturizers, pulp and paper mills, metal working fluids, dishwashing, laundry, and industrial once through systems such as power plants and potable water systems.

In general, and as described below with reference to the Figures, the present invention creates the oxidant by electrolytic and/or ultraviolet activation of an oxidant precursor.

According to the present invention there are five general types of oxidants which can be generated from oxidant precursors. The first three of these oxidant precursors are halide ions which are oxidized to form the corresponding hypohalous acid. In particular, chloride, bromide and iodide ions present in the water system added at the injection port, can be oxidized to form the corresponding hypohalous acids.

According to this method, it is generally preferable to have at least have trace (0.1–0.05) parts per million of the hypohalite ion present in the bulk water system (as opposed to side stream) depending on the particular water system that is being treated. In order to accomplish this, there must be at least about 0.5 ppm of halide ion present in the water passing through the treatment station. The halide ion can be added as the sodium, potassium or calcium halide salts. The sodium and potassium salts are preferred.

The fourth oxidant that can be generated according to the present invention is chlorine dioxide. In order to prepare the chlorine dioxide, a chlorite salt such as sodium chlorite or potassium chlorite is added to the main flow of water. Generally, 0.5 to about 10 ppm passing through the oxidant generation station will produce $ClO_2$ in the bulk water in trace amounts.

The fifth oxidant precursor is a peroxide such as $H_2O_2$, or peracetic acid, which generates free hydroxyl radicals, nascent oxygen and other free radicals.

These oxidant precursors can be used in combination with each other and thus provide a broad spectrum of algicidal and bactericidal activity.

Figure 1:
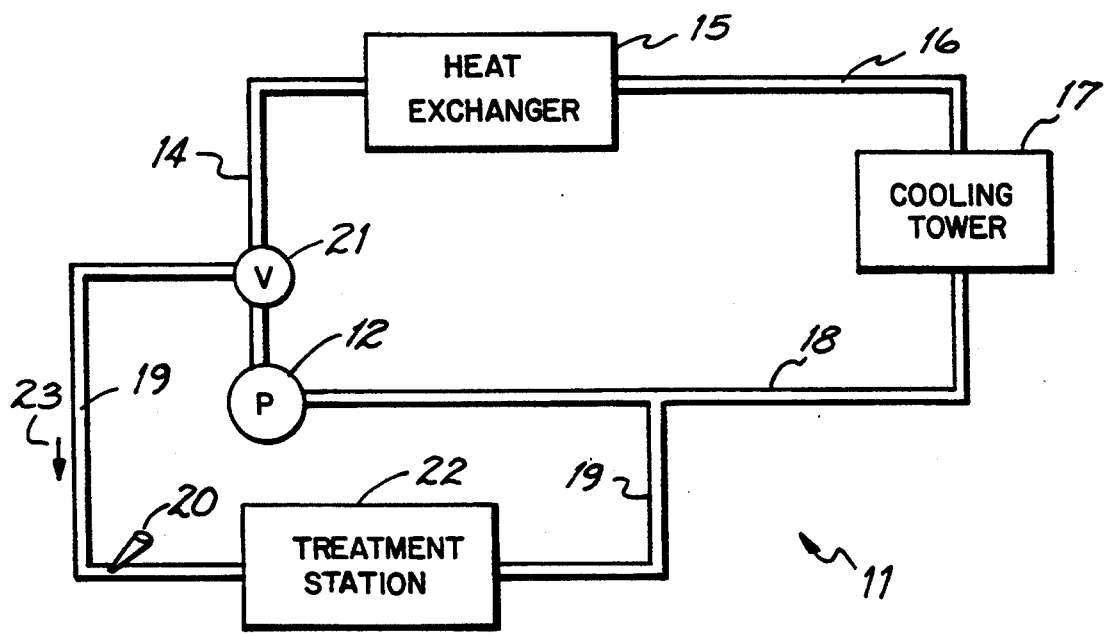
FIG. 1 is a diagrammatic depiction of a cooling system.

FIG. 1 shows a diagrammatic depiction of a cooling system 11. Such a system will include a pump 12 which forces water through a pipe or main stream 14 to a heat exchanger 15. From there the water passes through line 16 to a cooling tower 17. Return line 18 then leads back to pump 12.

A side stream 19 which starts at a valve 21 directs a portion of the water from line 14 to a treatment station 22. Side stream 19 can include one or more injection ports 20 to add an activatable oxidant precursor and/or acids to adjust the pH. The treatment station 22 is a UV or electrolysis unit as discussed below. The side stream 19 extends through treatment station 22 to line 18 downstream of pump 12.

As shown, the water flows in the direction of arrow 23 passing through treatment station 22. The water line 14 is at a greater pressure than the water in line 18, therefore water will naturally flow through line 19.

An open recirculating system incorporates a cooling tower 17 or alternately an evaporation pond (not depicted) to dissipate the heat removed from the process. The recirculation or flow rate is the flow (GPM) of cooling water being pumped through the entire plant cooling loop. This can be estimated from the pump nameplate data or can be calculated using a pump curve and a pressure gauge on the pump discharge.

On a system volume basis, the flow rate through the treatment station 22 is 0.1 to 0.5% expressed as GPM. The capacity of the treatment station 22 should be large enough to provide a trace residual oxidant in the bulk water system. The capacity of the station 22 and concentration of oxidant precursors can be changed to accomplish this.

Figure 2:
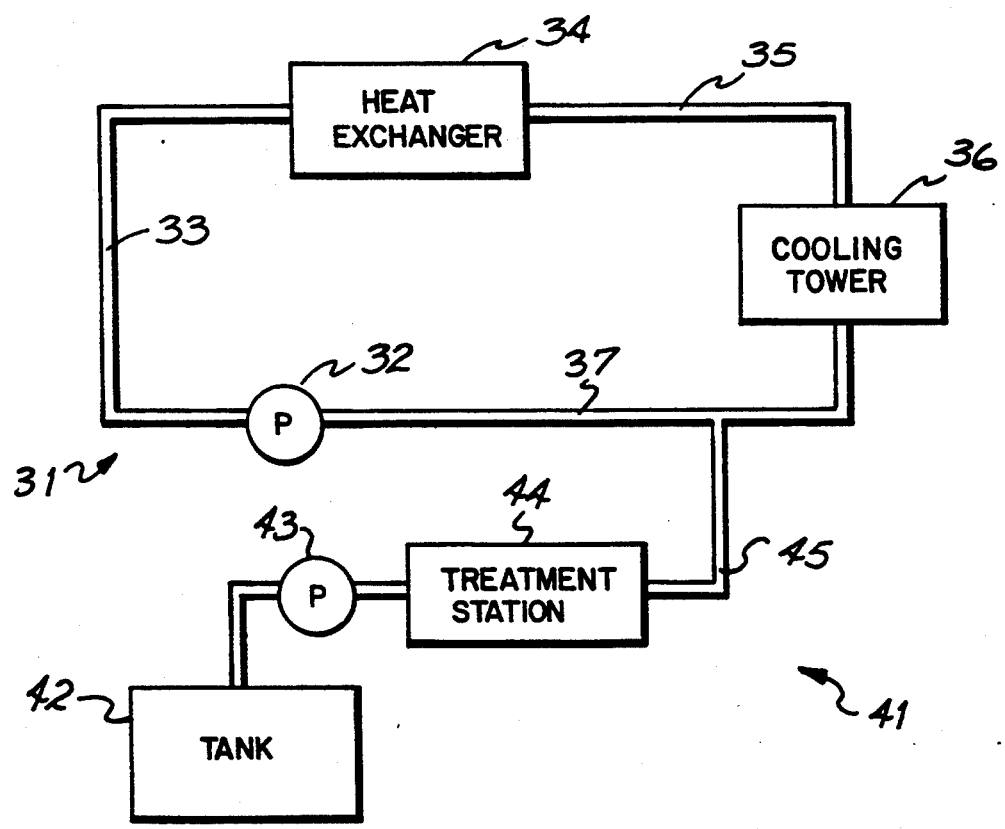
FIG. 2 is a diagrammatic depiction of an alternate embodiment of the present invention.

An alternate treatment apparatus is shown in FIG. 2 which also depicts a circulating water system 31 which also includes a pump 32 which forces water through a main line or stream 33 to a heat exchanger 34. From there it goes through line 35 to, for example, a cooling tower 36 and through return line 37 to pump 32. In order to add oxidant to act as a bactericide or algicide according to the present invention, a treatment injection system 41 is employed. This includes a container 42 of treatment agent. A pump or eductor 43 directs the treatment agent from tank 42 to the treatment station 44 and through line 45 into return line 37. Again, the capacity of this system should be such that the bulk water treatment will maintain a trace amount of oxidant.

Figure 3:
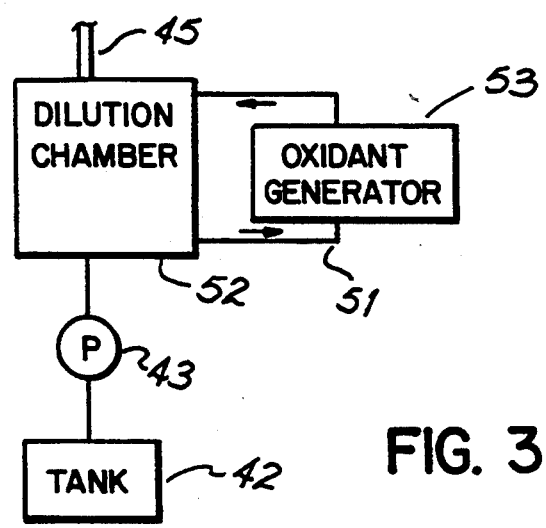
FIG. 3 is a diagrammatic depiction of a modification of the treatment section of FIG. 2.

In another alternate embodiment shown in FIG. 3, the treatment section 44 can include a recirculation loop 51 and a dilution chamber 52. In this embodiment pump 43 directs the treatment agent from tank 42 to dilution chamber 52 where it is diluted. The diluted treatment agent is then directed repeatedly through loop 51 and through the oxidant generator 53—either a UV light source or electrolysis unit. It can then be forced through line 45 into the process water system as needed.

By recirculating the solution containing the oxidant precursor through the oxidant generator more active oxidant can be generated prior to injecting it into the system.

When employing the system as shown in FIG. 2, referred to as a direct dosage application, the tank 42 of treatment composition can include, in combination with the oxidant or precursor, acid as well as additional treatment agents.

These additional treatment compositions for the present invention basically include any compatible chemical which will be added to the water of a process water system, such as a water cooling tower, chilled water system or pulp and paper processing plant, to alter any physical or chemical activity of the water. These chemical compositions include dispersants including organophosphorous compounds particularly organophosphorous carboxylic acids and phosphonates. One particular phosphonate is 1-hydroxylethyladene-1, 1-diphosphonic acid. A commonly employed organic phosphorus carboxylic acid is 2-phosphonobutane-1,2,4-tricarboxylic acid.

These chemical compositions also include corrosion inhibitors such as alkaline earth metal molybdates, chromates, and zinc which are used at higher concentrations. Sodium molybdate is an anodic inhibitor and is the most commonly used molybdate inhibitor. Other corrosion inhibitors include aromatic azoles primarily used as corrosion inhibitors for copper and its alloys. Generally included within the aromatic azoles are benzotriazole and tolyltriazole.

Chelants are also used as hardness sequestering agents. These include ethylenediaminetetra acetic acid (EDTA) and nitrilotriacetic acid (NTA).

Anionic polymers are used as dispersants and inhibitors. Such anionic polymers include polyacrylates, polymethacrylates, polymaleic anhydride and various copolymers of these. Synthetic sulfonated polymers, synthetic carboxylated polymers and carboxymethylcellulose are also used.

Compositions generally suitable for use in the present invention are disclosed in Baker et al. U.S. Pat. No. 4,719,083, the disclosure of which is incorporated herein by reference. The formulations disclosed therein can be used in combination with an oxidant precursor, i.e., 1–3% NaBr. The biocides would, of course, not be needed.

A preferred combination for use in the present invention for a cooling tower is an oxidant precursor such as 1–3% NaBr with 3–5% polyacrylic acid in combination with benzotriazole, sodium molybdate 1-hydroxylethyladene-1,1-diphosphoric acid and 1-phosphono butane 1,2,4-tricarboxylic acid.

For pulp and paper processing, the preferred solution may be an aqueous solution of $NaClO_2$, NaBr or a combination of these. This is also preferred for once through application, such as utilities, which are also concerned with control of zebra mussels.

The concentrate can generally be from about 2% oxidant precursor up to saturation. With hydrogen peroxide the concentration will be from a trace amount (less than about 0.1%) up to 9%. This can be used in combination with sodium chlorite (2% to saturation) in one embodiment.

For use in the present invention, the water passing through the side stream can be acidified to a pH less than 7, preferably a pH of 2 to 3 to promote subsequent oxidation reactions. This can be done by injecting a mineral acid such as hydrochloric acid or sulfuric acid directly into the side stream. Other acids suitable for adjusting the pH include phosphoric acid, phosphonic acid, polymethacrylic acid PMA (2–10,000 MW), polyacrylic acid, $CO_2$ (for in situ generation of carbonic acid) and aluminum sulfate.

The treatment section can be one of two oxidizing apparatus. The first is an electrolysis unit where the water passing through the side stream passes through the electrolysis unit and is subjected to a D.C. electric current flowing between two electrodes. The second is an ultraviolet light generator. In this apparatus, the water would flow through the generator and be irradiated with ultraviolet light. Either apparatus would oxidize the precursor present in the flowing water.

The electrolysis unit must operate at 5 to 500 coulombs per gallon to effectively oxidize the precursor flowing through the side stream depending on the concentration and species being generated.

Suitable electrolysis apparatuses are sold by Wallace and Tiernan division of Pennwalt, series 85-510 and 85-520 On Site Electrolytic Chlorination Unit. Another is the Lectronator sold by Lectronator Corporation of Cleveland, Ohio.

The ultraviolet irradiation apparatus must generate 2–2000 or higher microwatts second per $cm^2$ power per gallon of water. Suitable ultraviolet irradiation apparatus include that manufactured by Aquionics and Hanovia.

In a system employing an electrolysis unit, it should be located where the water temperature is highest which is generally in the return water. An ultraviolet light generator with a low pressure bulb operates at a maximum temperature of 105° F. Therefore, these should be located at the cold or supply side. UV generators having medium pressure bulbs can be located on the return water side of the system since they can operate at higher temperatures.

The present invention is particularly suitable for introduction of oxidants into pulp and paper processing plants. Specifically, the oxidant precursor can be taken from storage, pass directly through the oxidant generation station and injected directly into the process water in a pulp and paper process plant. In this embodiment, the oxidant precursor would preferably be, for example, a solution of sodium chlorite, solution of sodium bromide, or combination of hydrogen peroxide and sodium chlorite. It would be preferred to inject the generated oxidant directly into the pulp and paper process at the hydropulper, the white water system or the mill supply water.

An advantage of all the embodiments of the present invention is that the oxidant is generated in an aqueous solution and is injected directly into the process water system without separation of the oxidant, but rather this presents direct injection of the generated oxidant upon demand. This eliminates the need for any storage facilities, any separation facilities and employs relatively inert reactants which are safe and effective.

The invention will be further appreciated in light of the following detailed examples. These first examples demonstrate the generation of oxidants in-situ by reaction of water soluble inorganic halide salts with ultraviolet light:

EXAMPLE 1

Static Qualitative Tests

1) A 0.5% concentration of sodium bromide was prepared in deionized water. An analytical indicator for determination of oxidants, DPD, was added to the solution which was then subjected to irradiation with 254 nm UV light for three minutes. Available bromine was generated as evidenced by reaction with DPD indicator forming a redish-pink coloration.

2) A 0.5% concentration of potassium iodide was prepared in deionized water. Sulfuric acid was added to lower the pH to approximately 4 and starch as also added as an indicator. The solution was then subjected to irradiation with 254 nm UV light for 3 minutes. Available iodine was generated as evidenced by reaction with starch indicator forming a blue-colored complex.

3) A 2.5% concentration of sodium chlorite was subjected to 254 nm UV light for 3 minutes. Chlorine dioxide was generated as evidenced by formation of a slightly green-colored solution and gas with distinct chlorine dioxide odor.

EXAMPLE 2

Dynamic Qualitative Tests

1) Using a dynamic once-through flow method, 100 ml of 35% sodium chlorite was injected into a stream of deionized water entering a source of UV light generated by a medium pressure mercury arc-tube. The localized concentration of active sodium chlorite subjected to the UV light was estimated to be nearly 1.0%. Chlorine dioxide was present in the discharge from the UV chamber as evidenced by gassing and a resulting yellow-green colored solution which reacted with a starch/iodide indicator to form a blue iodine/starch complex.

2) Again using a dynamic once-through flow method, 50 ml of a 44% solution of sodium bromide was injected into a stream of deionized water entering a source of UV light generated by a medium pressure arc-tube source. The localized concentration of active sodium bromide subjected to the UV light was estimated to be nearly 0.9%. Available bromine was present in the water discharged from the UV chamber as evidenced by reaction of the solution with a starch/iodide indicator to form the blue iodine/starch complex. Also, a high "off-scale response" was obtained when the same discharge solution was tested with an amperometric titrator.

Additionally, more elaborate, quantitative testing was performed utilizing a dynamic recirculating flow system. Here, as in the qualitative dynamic tests, a stream of water containing various concentrations of halide salts were subjected to an in-line source of UV light generated by a medium pressure mercury arc-tube.

However, in these quantitative tests, a recirculating water-flow method was employed. Additionally, the reaction kenetics were studied as flow rates (hence UV dose), halide salt concentration and time were varied in these experiments. For all experiments, UV dose is defined as being the amount of ultraviolet light energy submitted to the halide salt solution in the UV chamber as a function of flow rate. It is expressed by the following equation: UV dose $(mWSec/cm^2) = 260 \times f/F(m^3h/hr)$ where f is a factor based on transmission values for the fluid and F is the solution flow rate expressed in $m^3/hr$. $f=0.77$ for all experimentation.

In all quantitative tests, the concentration of oxidants generated was determined by use of an amperometric titrator. Phenylarsene oxide (PAO) was utilized as the titrant.

The halide salt solutions tested were prepared with deionized water and experimentation was performed at pH 7–9 unless otherwise specified.

The halide salts studied quantitatively were: sodium bromide, potassium iodide, and sodium chlorite.

It should be noted that a blank or baseline experiment was first performed by irradiating only the deionized water at neutral pH with a UV dose of 869 m $WSec/cm^2$. No oxidant generation resulted as evidenced by amperometric titration and testing with DPD.

EXAMPLE 3

Dynamic Quantitative Tests

1) Sodium bromide experimentation. Table 1 shows the relationship between the concentration of sodium bromide in solution versus the flow rate of solution through the UV irradiation chamber in order to achieve in-situ oxidant generation. Results show that the reaction is not very fruitful, even at low flow rates (higher UV dosage), until the pH is lowered or until $CO_3$ ions are reduced or eliminated. Alternately, this reaction may have been poisoned by $CO_3$. Hence, the in-situ generation of available bromine from its halide salt via UV irradiation appears to be acid catalyzed.

2) Potassium iodide experimentation. Table II shows the relationship between the concentration of potassium iodide in solution versus the flow rate of solution through the UV irradiation chamber, as a function of time, in order to achieve in-situ iodine generation.

It is noted that a useful amount of oxidant is produced over a range of relatively low to higher flow rates, potassium iodide concentration and even at lower recirculation times, i.e., 10 to 60 minutes.

This data shows that to generate the greatest amount of available iodine in the shortest period of time, low flow rates (high UV dose) combined with higher salt (KI) concentration are optimal.

For example, 1 gpm flow rate (UV dose=869 $mWSec/cm^2$) at 992 ppm concentration of KI in solution yielded 4.7 ppm available iodine in 10 minutes. Where, as the lower concentrations of KI, such as 58 ppm and 11 ppm exposed to UV at the same 1 gpm flow rate, yielded only 0.4 and 0.0 ppm respectively at pH 7 and after 10 minutes of recirculation. However, higher flow rates (lower UV dosage), such as 12 gpm (UV dose=72.6 $mWSec/cm^2$) and 23 gpm (UV dose=37.9 $mWSec/cm^2$) at relatively low (58 ppm) concentration of KI were still effective in generating iodine in-situ: 0.72 ppm and 0.68 ppm iodine were obtained after 30 minutes of recirculation.

Additionally, Table II shows that lowering the pH of the KI solution catalyzes the in-situ generation reaction by UV irradiation. At a flow rate of 1 gpm and 58 ppm concentration of KI, 10 minutes of recirculation yields 1.8 ppm available iodine at pH 4.35 while no available iodine is produced at pH 7.0 at the same exposure time. Longer recirculation, such as 2 hours, yields 2.0 ppm and 0.43 ppm available iodine at these respective pH's. A wide range of UV dose, i.e., 39–1739 $mWSec/cm^2$, was found to effectively induce photo-oxidation of potassium iodide to generate available iodine even at low concentration such as 11 ppm KI.

3) Sodium chlorite experimentation. Table III depicts the data for the photo-oxidation of sodium chlorite solutions for generation of chlorine dioxide. Note that all photolysis reactions were conducted at slightly alkaline pH's in order to avoid any inadvertent acid-induced generation of chlorine dioxide.

Working with low concentration of sodium chlorite, 11 and 58 ppm, both low and high UV doses were utilized for the photo-reaction (39 & 869 $mWSec/cm^2$). In all cases, a useful amount of chlorine dioxide was generated, as determined by PAO titration amperometrically, within only a few minutes. At these same low concentrations of sodium chlorite, chlorine dioxide concentrations in the range of approximately 0.5–6.7 ppm were obtained in 3 to 30 minutes depending on the UV dose.

TABLE 1

Available Bromine Generation Via UV Photolysis of Sodium Bromide

| Flow Rate | UV Dose | [NaBr] | [Avl. Br] | pH | Time |
|---|---|---|---|---|---|
| 1 gpm | 869 m $WSec/cm^2$ | 5 ppm | 0 | 7.0 | 1 hr |
| 4 | 218 | 950 | 0 | 7.0 | 1 hr |
| 8 | 109 | 756 | 0 | 7.0 | once-thru |
| 1 | 869 | 756 | 0.11 | 7.0 | once-thru |
| 1 | 869 | 900 | 0 | 7.0 | 1 hr |
| 1 | 869 | 450 | 0 | 7.0 | 2 hrs |
| 1 | 869 | 450 | 0.14 | 4.3 | 1 hr |
| 1 | 869 | 450 | 0.20 | 4.3 | 2½ hrs |
| 1 | 869 | 45 | 0.11 | 4.3 | 2½ hrs |
| 22.5 | 39 | 450 | 0 | 7.0 | 4 hrs |

TABLE II

Available Iodine Generation Via UV Photolysis of Potassium Iodide

| Flow Rate | UV Dose | [KI] | [AVL. I] | pH | Time |
|---|---|---|---|---|---|
| 1 gpm | 869 m $WSec/cm^2$ | 11 ppm | 0.0 ppm | 7.0 | 30 min |
| 0.5 | 1739 | 100 | 0.72 | 7.0 | 30 min |
| 0.5 | 1739 | 1000 | 1.50 | 7.0 | 15 min |
| 4.0 | 218 | 11 | 0.0 | 7.0 | 1 hr |

TABLE II-continued

Available Iodine
Generation Via UV Photolysis of Potassium Iodide

| Flow Rate | UV Dose | [KI] | [AVL. I] | pH | Time |
|---|---|---|---|---|---|
| 4.0 | 218 | 58 | 0.72 | 7.0 | 30 min |
| 4.0 | 218 | 1000 | 3.94 | 7.0 | 30 min |
| 25.0 | 35 | 58 | 0.0 | 7.0 | 30 min |
| 12.0 | 73 | 58 | 0.72 | 7.0 | 30 min |
| 22.5 | 39 | 58 | 0.68 | 7.0 | 30 min |
| 22.5 | 39 | 58 | 0.68 | 7.0 | 30 min |
| 22.5 | 39 | 11 | 0.54 | 7.0 | 1½ hr |
| 1 | 869 | 58 | 1.80 | 4.3 | 30 min |
| 1 | 869 | 58 | 0.47 | 7.0 | 30 min. |

TABLE III

Chlorine Dioxide
Generation Via UV Photolysis of Sodium Chlorite

| Flow Rate | UV Dose | [Na ClO$_2$] | [ClO$_2$] | pH | Time |
|---|---|---|---|---|---|
| 1 gpm | 869 m WSec/cm$^2$ | 11 | 2.1 ppm | 8.5 | 5 min |
| 1 | 869 | 58 | 6.7 | 8.5 | 5 min |
| 1 | 869 | 11 | 0.76 | 8.5 | 30 min |
| 1 | 869 | 58 | 3.8 | 8.5 | 30 min |
| 22.5 | 39 | 11 | 0.48 | 9.0 | 3 min |
| 22.5 | 39 | 58 | 1.24 | 9.0 | 3 min |
| 22.5 | 39 | 11 | 1.87 | 9.0 | 30 min |
| 22.5 | 39 | 58 | 6.61 | 9.0 | 30 min |

EXAMPLE 4

The following tests demonstrate electrolytic oxidant generation.

1.) A 380 ppm solution of sodium bromide was prepared in deionized water and subjected to an electrolytic field in a recirculating flow through system. The resulting oxidant concentration was determined by the DPD method-analytical indicator for oxidants. The test conditions were as follows:

| pH: | 7.0 |
|---|---|
| Temperature: | 74.8 F. |
| Recirculation Rate: | 2300 ml/min. |
| System Size: | 18.92 L |
| Volts: | 27 |
| Amps: | 2.0 |
| Test Method: | DPD |

The resultant oxidant generation is as follows:

| Time (Min.) | ppm Bromine |
|---|---|
| 0.0 | 0.0 |
| 10 | 3.6 |
| 15 | 9.4 |
| 45 | 12.3 |

2.) A 250 ppm solution of sodium chloride was prepared in deionized water and subjected to an electrolytic field with varying DC current in a dynamic once through system. The solution pH was 7.5 and the system temperature was 75 F. The flow rate was 1700 ml/30 seconds or 0.9 gallons per minute. The resultant oxidant concentration on a once through basis was determined by the DPD method-an analytical indicator for oxidants.

Resultant oxidant generation and DC current required.

| Volts | Amps | ppm Chlorine |
|---|---|---|
| 6 | 0.25 | 0.15 |
| 10 | 0.5 | 0.35 |
| 16 | 1.0 | 0.8 |
| 24 | 1.5 | 1.5 |
| 27 | 2.0 | 1.7 |

These preceding examples demonstrate both the efficacy of the ultraviolet light as well as an electrolysis unit and generating active oxidants in an aqueous environment. Further, these demonstrate the efficacy of these in a recirculating water system. This all produces several distinct advantages of the present invention.

EXAMPLE 5

One "Lectranator" brand electrolytic cell was installed on the bypass loop of an operating cooling tower. The "Lectranator" was permitted to run continuously all day. The Lectranator was set to discharge current 90% of time it was on. The cooling tower water had 1-3 ppm NaBr at all times. Samples were pulled from the bypass loop, and from the basin. A DPD test kit was used to measure the amount of oxidant in the system water. Samples that were pulled for bacteria analysis were neutralized with 0.25 ml of 10% Sodium Thiosulfate. With a flow rate of five gallons per minute through the bypass loop the following results were obtained.

| OXIDANT LEVELS | | | |
|---|---|---|---|
| 9:30 am | Start up (Lectranator off) | | |
| | DPD | Basin | Loop |
| | Total Oxidant | 0 | 0 |
| | Free Oxidant | 0 | 0 |
| 10:30 am | 1 hour | | |
| | DPD | Basin | Loop |
| | Total Oxidant | 0 | 1.0 |
| | Free Oxidant | 0 | 0.7 |
| 1:00 pm | 3.5 hours | | |
| | DPD | Basin | Loop |
| | Total Oxidant | Trace | 1.0 |
| | Free Oxidant | 0 | 0.7 |
| 2:00 pm | 4.5 hours | | |
| | DPD | Basin | Loop |
| | Total Oxidant | Trace | 1.0 |
| | Free Oxidant | 0 | 0.7 |
| 3:00 pm | 5.5 hours | | |
| | DPD | Basin | Loop |
| | Total Oxidant | Trace | 1.0 |
| | Free Oxidant | 0 | 0.7 |

| BACTERIAL COUNTS | | | |
|---|---|---|---|
| Time | | Loop (org/ml) | Basin (org/ml) |
| 9:30 am | (No treatment) | 76,000 | 83,000 |
| 10:30 am | | 8,500 | 59,000 |
| 11:30 am | | 10,300 | 55,000 |
| 1:00 pm | | 10,900 | 30,000 |
| 2:00 pm | | 110 | 26,000 |
| 3:00 pm | | 11,000 | 36,000 |

On the next day a second "Lectranator" was put in the bypass loop of the cooling tower so that it was in series with the first "Lectranator." Both "Lectranators" were run all day with samples being pulled from the basin and bypass loop every hour to measure the oxidant level with a DPD test kit. Samples were also pulled and neutralized with 0.25 ml of 10% Sodium Thiosulfate for bacteria counts.

| OXIDANT LEVELS | | | |
|---|---|---|---|
| 9:00 am | No Treatment | | |
| | DPD | Basin | Loop |
| | Total Oxidant | Trace | 0 |
| | Free Oxidant | 0 | 0 |
| 10:00 am | 1 hour | | |
| | DPD | Basin | Loop |
| | Total Oxidant | Trace | 3.5 |
| | Free Oxidant | 0 | 3.0 |
| 11:00 pm | 2 hours | | |
| | DPD | Basin | Loop |
| | Total Oxidant | Trace | 3.5 |
| | Free Oxidant | 0 | 3.5 |
| 1:00 pm | 4 hours | | |
| | DPD | Basin | Loop |
| | Total Oxidant | Trace | 3.5 |
| | Free Oxidant | 0 | 3.5 |
| 2:00 pm | 5 hours | | |
| | DPD | Basin | Loop |
| | Total Oxidant | Trace | 3.5 |
| | Free Oxidant | 0 | 3.5 |
| 3:00 pm | 6 hours | | |
| | DPD | Basin | Loop |
| | Total Oxidant | Trace | 3.5 |
| | Free Oxidant | 0 | 3.5 |

| BACTERIAL COUNTS | | |
|---|---|---|
| Time | Loop (org/ml) | Basin (org/ml) |
| 10:00 am | 104,000 | 93,000 |
| 11:00 am | 240 | 100,000 |
| 1:00 pm | 1,750 | 59,000 |
| 2:00 pm | 990 | 93,000 |
| 3:00 pm | 4,400 | 62,000 |

The above data does indicate that having electrolysis units in series is better than having only one in the bypass loop. It was surprising that the amount of oxidant produced was approximately 3 times instead of two times the amount of oxidant produced by one electrolysis unit. This is related to the contact time the water in the cooling system has with the electrolysis unit.

To determine how contact time affected the production of oxidant the flow rate was varied and the oxidant in the bypass loop was measured using a DPD test kit. Also the number of electrolysis units that were activated was varied.

| | Total | Free |
|---|---|---|
| 5 Gallons/minute | | |
| 1 unit on | 1.0 | 0.5 |
| 2 units on | 3.0 | 1.5 |
| 11 Gallons/minute | | |
| 1 unit on | 0.7 | Trace |
| 2 units on | 1.0 | 0.5 |
| 13 Gallons/minute | | |
| 1 unit on | 0.5 | Trace |
| 2 units on | 0.7 | Trace |
| 14 Gallons/minute | | |
| 1 unit on | 0.4 | 0 |
| 2 units on | 0.5 | Trace |

After the electrolysis units were run in series, the bypass loop was switched to have all the electrolysis units run in parallel.

| | Total | Free |
|---|---|---|
| 5 Gallons/minute | | |
| 1 unit on | 1.0 | 0.5 |
| 2 units on | 2.7 | 1.7 |
| 3 units on | 3.0 | 2.0 |
| 13 Gallons/minute | | |
| 1 unit on | 0.5 | Trace |
| 2 units on | 1.0 | 0.2 |
| 3 units on | 1.0 | 0.5 |
| 14 Gallons/minute | | |
| 1 unit on | 0.4 | Trace |
| 2 units on | 1.0 | Trace |
| 3 units on | 1.0 | 0.5 |

The electrolysis units were run in parallel all day to determine if any residual oxidant could be detected in the basin. Before the electrolysis units were turned on, a trace of total oxidant was detected in the basin. The three electrolysis units were turned on and samples were pulled throughout the day. The bypass loop netted total oxidant of 3.0 ppm and free oxidant of 2.0 ppm. The basin showed a trace of total oxidant and no free oxidant.

EXAMPLE 6

Field test experimentation was performed utilizing an ultraviolet disinfection unit (Model UV-60) manufactured by Hanovia Ltd.-Slough England and engineered by Aquionics, Inc., Erlanger, Ky. The UV lamp source in this unit is a medium pressure arc-tube design which emits energy typically in the range of 240 nm to 280 nm with a concentration of specific output at 253.7 nm.

Two flow rates were evaluated for the Model UV-60 device and a side stream disinfection test at a cooling tower water system. The cooling tower system was currently being chemically treated with an all-in-one treatment program containing antiscalants, corrosion inhibitors and an algicide/bacteriastat applied on a continuous basis. The particular microbiocide in this program is maintained in the system water to approximate concentration of 5 ppm actives.

The flow rates tested were 4 gpm and 60 gpm through the UV-60 device. Samples of the bulk cooling water were collected at various time intervals and were analyzed for total heterotrophic organisms as a function of time employing the UV treatment. This data is depicted in Tables IV and V, respectively, for the 4 gallon and 60 gallon per minute flow rates.

TABLE IV

| SIDE-STREAM "DISINFECTION" OF COOLING TOWER SYSTEM BY UV-60 DEVICE: 4 GPM FLOW RATE | | | | | |
|---|---|---|---|---|---|
| DAY (TIME) | TEST CONDITION | HETEROTROPHIC COUNT ORG/ML | PERCENT REDUCTION IN HETEROTROPHIC POPULATION AT TIME | *PERCENT OF SYSTEM H2O VOLUME THRU DEVICE AT TIME | PERCENT AVG. HOURLY REDUCTION OF SYSTEM HETEROTROPHS |
| Day 1 (10:00 am) | BEFORE UV; BASELINE | 1,570,000 | N/A | 0.09% | N/A |
| Day 1 (4:00 pm) | 6 HRS. OF UV | 290,000 | 81.5% | 32.00% | 13.6% |
| Day 2 | BEFORE UV; | 990,000 | N/A | 0.9% | N/A |

TABLE IV-continued

SIDE-STREAM "DISINFECTION" OF COOLING TOWER SYSTEM BY UV-60 DEVICE: 4 GPM FLOW RATE

| DAY (TIME) | TEST CONDITION | HETEROTRO-PHIC COUNT ORG/ML | PERCENT REDUCTION IN HETEROTROPHIC POPULATION AT TIME | *PERCENT OF SYSTEM H2O VOLUME THRU DEVICE AT TIME | PERCENT AVG. HOURLY REDUCTION OF SYSTEM HETEROTROPHS |
|---|---|---|---|---|---|
| (11:00 am) Day 2 (3:30 pm) | BASELINE 4.5 HRS OF UV | 310,000 | 68.7% | 24.00% | 15.3% |
| Day 6 (10:30 am) | BEFORE UV; BASELINE | 420,000 | N/A | 0.09% | N/A |
| Day 6 (12:30 pm) | 2.0 HRS. OF UV | 140,000 | 66.7% | 10.67% | 33.4% |
| Day 6 (2:15 pm) | 3.75 HRS OF UV | 240,000 | 42.9% | 20.00% | 11.4% |
| Day 6 (3:50 pm) | 5.33 HRS OF UV | 100,000 | 76.2% | 28.40% | 14.3% |

*Assumes that water which passed thru the UV device does not return to pass back thru it again.

TABLE V

SIDE-STREAM "DISINFECTION" OF COOLING TOWER SYSTEM BY UV-60 DEVICE: 60 GPM FLOW RATE

| DAY (TIME) | TEST CONDITION | HETEROTRO-PHIC COUNT ORG/ML | PERCENT REDUCTION IN HETEROTROPHIC POPULATION AT TIME | *PERCENT SYSTEM H2O VOLUME THRU DEVICE AT TIME | PERCENT AVG. HOURLY REDUCTION OF SYSTEM HETEROTROPHS |
|---|---|---|---|---|---|
| 8:30 am | BEFORE UV; BASELINE | 748,000 | N/A | 1.33% | |
| 8:34 am | 4 MIN. OF UV | 834,000 | (11.0%)** | 5.33% | |
| 8:38 am | 8 MIN. OF UV | 662,000 | 11.5% | 10.67% | |
| 8:42 am | 12 MIN. OF UV | 575,000 | 23.1% | 16.00% | |
| 8:46 am | 16 MIN. OF UV | 633,000 | 15.4% | 21.33% | |
| 8:50 am | 20 MIN. OF UV | 489,000 | 34.6% | 26.67% | |
| 8:54 am | 24 MIN. OF UV | 633,000 | 15.4% | 32.00% | |
| 8:58 am | 28 MIN. OF UV | 374,000 | 50.0% | 37.33% | |
| 9:30 am | 1 HR. OF UV | 317,000 | 57.6% | 80.00% | 57.6 |
| 10:30 am | 2 HRS. OF UV | 184,000 | 75.4% | 160.00% | 42.0 |
| 11:30 am | 3 HRS. OF UV | 90,000 | 88.0% | 240.00% | 51.0 |
| 12:30 pm | 4 HRS. OF UV | 62,000 | 91.7% | 320.00% | 31.1 |
| 1:30 pm | 5 HRS. OF UV | 39,000 | 94.8% | 400.00% | 37.1 |
| 2:30 pm | 6 HRS. OF UV | 35,000 | 95.3% | 480.00% | 10.3 |
| 3:30 pm | 7 HRS. OF UV | 28,400 | 96.2% | 560% | 18.9 |

*Assumes that water which passed thru the UV device does not return to pass back thru it again.
**Represents an initial increase in percent hetertrophic population in the first sample It was interesting to note that to reach a given reduction of heterotroph population less system water has passed through and subjected to the UV radiation at 4 gallons per minute, than at 60 gallon per minute flow rate. For example, to obtain a level of 80% reduction in hetertrophs at a 4 gallon per minute flow rate only about 30% of the system water was passed through the UV-60 device whereas approximately 200% of the system water was subjected to UV radiation to obtain the same reduction at the 60 gallon per minute flow rate. This is an unexpected increase in the efficiency in the degree of UV disinfection of the recirculating cooling tower water. This increase in efficacy is dependent on irradiating the water with sufficient light energy to produce a residual effect in the bulk water, i.e. downstream of the bypass loop. This effectively destroys attached bacteria as well as free floating forms in the water system. Generally a dosage of 90,000 microwatts-seconds per square centimeter (at all points throughout the water disinfection chamber) will provide this result. Higher dosages in the range of 150,000 to 300,000 is preferred. In the example the dosage was 220,000 (2,537 Angstroms).

The in situ generation of the oxidants eliminates the requirement for a large capital expenditures for generating equipment or storage vessels. It further generates oxidants in a manner which eliminates the handling of hazardous materials and provides for generation on demand as the system operates thereby avoiding the overuse of an oxidant. Further, the halide salts employed in this system will react over and over again in a redox system.

By operating on the side stream, a less powerful light source or electrolysis source is required. Specifically with ultraviolet irradiation, this did not adversely effect phosphonate antiscalants or corrosion inhibitors. This is in part due to the low intensity of the radiation. Further, in the present invention, phosphonic acid can be used to acidify the liquid flowing through the side stream. This acts as an antiscalant and corrosion inhibitor and accordingly provides an additional advantage of the present invention.

These and other advantages can be obtained by practicing the present invention. The preceding has been a description of the present invention as well as the preferred embodiment of the present invention currently known to the inventors. However, this invention should be defined only by the appended claims wherein we claim:

What is claimed is:

1. A method of treating process water circulating in a process water system comprising:
   diverting from about 1 to about 5% of said water of said water from said circulating water system;

adding an oxidant precursor to said water directed from said water system;

said oxidant precursor selected from the group consisting of bromide salt, iodide salt, chlorite salt, chloride salt and peroxide and combinations thereof;

passing said water through an ultraviolet light-generating activation station;

returning said water to said water system whereby the amount of said oxidant precursor added to said system and in combination with the energy supplied by said activation station is sufficient to establish at least a trace concentration of said oxidant in the bulk water of said system; wherein said water includes additional water treatment agents selected from the group consisting of phosphonates and aromatic azoles.

2. The method claimed in claim 1 wherein at least 2 of said oxidant precursors are added to said diverted water.

3. The method claimed in claim 1 wherein said solution of oxidant precursor is forced through said oxidant generation station a plurality of times.

4. The method claimed in claim 1 wherein said solution of oxidant precursor is diluted in a chamber and is recirculated through said oxidant generation station back into said chamber before being injected into said water system.

5. The method claimed in claim 1 wherein said water diverted from said water system is acidified to a pH of less than 7 prior to passing through said activation station.

6. The method claimed in claim 5 wherein said water is acidified to a pH of less than 4.

7. The method claimed in claim 6 wherein said water is acidified by adding an acid selected from the group consisting of polymethyacrylic acid, polyacrylic acid, phosphonic acid, aluminum sulfate HCl, $CO_2$, $H_2SO_4$ and phosphoric acid to said water.

* * * * *